United States Patent [19]

Kishimoto et al.

[11] Patent Number: 4,501,857

[45] Date of Patent: Feb. 26, 1985

[54] METHOD FOR HYDROGENATION OF POLYMER

[75] Inventors: Yasushi Kishimoto, Ayase; Hideo Morita, Yokohama, both of Japan

[73] Assignee: Asahi Kasei Kogyo Kabushiki Kaisha, Osaka, Japan

[21] Appl. No.: 568,692

[22] Filed: Jan. 6, 1984

[30] Foreign Application Priority Data

Jan. 20, 1983 [JP] Japan .................................. 58-6718
Oct. 7, 1983 [JP] Japan .............................. 58-186983

[51] Int. Cl.³ .............................................. C08F 8/04
[52] U.S. Cl. ................................ 525/338; 525/331.9; 525/332.3; 525/332.8; 525/332.9; 525/333.1; 525/333.2
[58] Field of Search ........................................ 525/338

[56] References Cited

U.S. PATENT DOCUMENTS

| | | | |
|---|---|---|---|
| 3,696,088 | 10/1972 | De Vault | 525/338 |
| 3,700,633 | 10/1972 | Wald et al. | 525/338 |
| 3,700,748 | 10/1972 | Winkler | 525/338 |
| 3,993,855 | 11/1976 | Kang | 525/338 |
| 4,049,753 | 9/1977 | Moczygemba | 525/338 |
| 4,057,601 | 11/1977 | Moczygemba | 525/338 |
| 4,174,360 | 11/1979 | Moczygemba | 525/338 |

Primary Examiner—Joseph L. Schofer
Assistant Examiner—Bernard Lipman
Attorney, Agent, or Firm—Birch, Stewart Kolasch & Birch

[57] ABSTRACT

Selective hydrogenation of unsaturated double bonds in conjugated diene units of a conjugated diene polymer resulting from polymerization of copolymerization of a conjugated diene is effected by a method which comprises hydrogenating the conjugated diene polymer in an inert solvent in the presence of:

(A) at least one bis-(cyclopentadienyl) titanium compound or (B) at least one hydrocarbon lithium compound containing at least one lithium atom in addition to (A) the aforementioned at least one bis-(cyclopentadienyl) titanium compound as a catalyst (providing that the presence of both the two components, (A) and (B), is essential where the conjugated diene polymer under treatment is other than a living polymer containing a lithium atom in the polymer chain thereof).

31 Claims, No Drawings

METHOD FOR HYDROGENATION OF POLYMER

BACKGROUND OF THE INVENTION

1. Field of the Invention

This invention relates to a method for catalytic hydrogenation effected on a polymer of a conjugated diene for the purpose of imparting to the polymer an ability to resist weather conditions, oxidation, heat, etc. More particularly, this invention relates to a novel method for preferentially hydrogenating unsaturated double bonds in conjugated diene units of the polymer under mild hydrogenation conditions by the use of a polymer hydrogenation catalyst comprising at least one specific titanium compound.

2. Description of the Prior Art

Generally, polymers obtained by polymerizing or copolymerizing conjugated dienes are widely utilized for commercial purposes. These polymers have unsaturated double bonds as residues in their polymer chains. These unsaturated double bonds are advantageously utilized as for vulcanization and yet have a disadvantage that they are deficient in stability to resist weather conditions, oxidation, etc. Particularly, block copolymers obtained from conjugated dienes and vinyl-substituted aromatic hydrocarbons are used in their unvulcanized state as thermoplastic elastomers and transparent impact-resistant resins or as modifiers for styrenic resins and olefinic resins. Owing to the unsaturated double bonds present in their polymer chains, however, such block copolymers are deficient in resistance to weather conditions, oxidation, and ozone. In the field of exterior materials to which such properties are indispensable, therefore, the block copolymers find limited utility because of this drawback.

This deficiency in stability can be notably improved by hydrogenating such a block copolymer and consequently eliminating the unsaturated double bonds persisting in the polymer chain thereof. Numerous methods have been so far proposed for hydrogenating hydrocarbon polymers containing unsaturated double bonds for the aforementioned purpose. In the catalysts available for these methods of polymer hydrogenation, (1) carried heterogeneous catalysts having such metals as nickel, platinum, palladium, and ruthenium deposited on carriers such as carbon, silica, alumina, silica-alumina, and diatomaceous earth and (2) so-called Ziegler type homogeneous catalysts obtained by causing organic acid salts of nickel, cobalt, iron, or chromium or acetylacetone salts to react with a reducing agent such as an organic aluminum compound in a solvent are popular.

The former carried heterogeneous catalysts of (1) generally exhibit lower levels of activity than the Ziegler type homogeneous catalysts. To provide effective hydrogenation, therefore, they require hydrogenation to proceed under harsh conditions such as elevated temperatures and high pressure. On a polymer which is to be hydrogenated, no hydrogenation proceeds unless the polymer is exposed to such a catalyst as described above. In the hydrogenation of a polymer, unlike that of a low molecular weight compound, the contact of the polymer with the catalyst is difficult because of the influences of high viscosity acquired by the reaction system and steric hindrance caused by the polymer chain. For the polymer to be efficiently hydrogenated, therefore, the catalyst is required to be used in too large an amount so as to render the hydrogenation uneconomical and the reaction of hydrogenation is also required to be carried out at elevated temperatures under high pressure, namely under conditions liable to induce decomposition and gelation of the polymer. In the hydrogenation of a copolymer of a conjugated diene and a vinyl-substituted hydrocarbon, selective hydrogenation of the unsaturated double bonds in the conjugated diene units of the copolymer generally becomes difficult because the hydrogenation also occurs on the aromatic nucleus portion of the copolymer.

In contrast, the latter Ziegler type homogeneous catalysts of (2) are characterized by exhibiting generally higher levels of activity, effecting hydrogenation at lower rates of use, and providing hydrogenation at lower temperatures under lower pressure than the carried heterogeneous catalysts because the reaction of hydrogenation generally proceeds in a homogeneous system. Depending on the selection of the conditions of hydrogenation, they are also capable of effecting preferential hydrogenation of the unsaturated double bonds of conjugated diene units in copolymers of conjugated dienes and vinyl-substituted aromatic hydrocarbons to a fairly large extent. The Ziegler type homogeneous catalysts, however, generally suffer from a disadvantage that these catalysts do not easily manifest the hydrogenating activity unless they are prepared immediately before use by mixing their components and reducing the resultant mixtures, they are deficient in repeatability of behavior, and the exhibit inferior stability despite the reduction given preparatorily thereto, making it indispensable for these catalysts to be prepared immediately before actual use each time they are employed in the hydrogenation. Further, particularly in the hydrogenation of a copolymer of a conjugated diene and a vinyl-substituted aromatic hydrocarbon, thorough selectivity of the hydrogenation of the unsaturated double bonds of conjugated diene units relative to the aromatic nucleus portion has not yet been fulfilled. Under the conditions which permit thorough hydrogenation of the unsaturated double bonds of conjugated diene units, the aromatic nucleus portion of the copolymer is inevitably hydrogenated to some extent. Conversely, under the conditions which completely prevent hydrogenation of the aromatic nucleus portion of the copolymer, the hydrogenation of the unsaturated double bonds of conjugated diene units does not occur at an amply high ratio. In this circumstance, development of a catalyst capable of selectively hydrogenating the unsaturated double bonds of conjugated diene units has been highly desired.

Further, the existing Ziegler type catalysts for hydrogenation are expensive and they have a disadvantage that the expulsion of residual catalysts from the hydrogenation products calls for a complicated removal process. For the purpose of effecting the hydrogenation advantageously from the economic point of view, it is earnestly desired to develop a highly effective hydrogenation catalyst capable of manifesting the desired effect at a rate of consumption low enough to obviate the necessity for deliming or a catalyst capable of permitting very easy removal thereof.

SUMMARY OF THE INVENTION

The inventors, in view of the circumstances described above, made a diligent study in search of a highly selective hydrogenstion catalyst capable of effecting hydrogenation of only the unsaturated double bonds in conjugated diene units of a conjugated diene polymer or copolymer. They have consequently found that catalysts comprising bis-(cyclopentadienyl)-titanium compounds and alkyl lithium compounds exhibit very high activity in small ratios of application with high repeatability on the aforementioned polymer and have extremely high selectivity in the hydrogenation of the unsaturated double bonds in conjugated diene units and further that surprisingly, where the polymer to be hydrogenated is a living polymer obtained by using an organic lithium as a polymerization catalyst, a catalyst formed solely of bis-(cyclopentadienyl)titanium compound used in a small amount in the reaction system instead of the combination of the aforementioned titanium compound and a reducing metal compound as an alkyl lithium compound exhibits very high hydrogenation activity on the polymer and very high selectivity in the hydrogenation of the unsaturated double bonds in conjugated diene units. This knowledge has led to perfection of the present invention.

To be specific, this invention relates to a method for the hydrogenation in an inert organic solvent of a conjugated diene polymer obtained by polymerization or copolymerization of a conjugated diene, characterized by exposing the aforementioned conjugated diene polymer to hydrogen in the presence of:

(A) at least one bis-(cyclopentadienyl)titanium compound represented by the general formula:

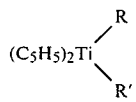

(wherein R and R' denote identical or unidentical groups selected from the class consisting of $C_1-C_8$ alkyl and alkoxy groups, $C_6-C_8$ aryl, aryloxy, aralkyl, and cycloalkyl groups, halogen groups, and a carbonyl group) or (B) at least one hydrocarbon lithium compound having at least one lithium atom in addition to (A) the aforementioned at least one bis-(cyclopentadienyl)-titanium compound as a catalyst (providing that the presence of both the components, (A) and (B), is essential where the aforementioned polymer is a polymer other than a living polymer having a lithium atom in the polymer chain thereof) thereby effecting selective hydrogenation of unsaturated double bonds in conjugated diene units of the aforementioned polymer.

DETAILED DESCRIPTION OF THE INVENTION

The term "conjugated diene polymer" as used in the present invention means both a homopolymer and a copolymer of a conjugated diene. Specifically, this term embraces homopolymers of conjugated dienes, random or block polymers of two or more conjugated dienes, and random block and/or graft copolymers of at least one conjugated diene and at least one monomer copolymerizable with the aforementioned conjugated diene.

The term "living polymer" as used in the present invention has a meaning so extensive as to embrace homopolymers and copolymers of conjugated dienes obtained by using an organic lithium compound as a polymerization catalyst and polymers possessing a lithium atom in the polymer chains thereof and consequently having an ability to gain in growth through polymerization of an additional monomer. Specifically, living homopolymers of conjugated dienes, random and/or block living copolymers of two or more conjugated dienes, and random and/or block living copolymers of at least one conjugated diene and at least one other living monomer copolymerizable with the aforementioned conjugated diene.

It has already been known that the catalysts which combine bis-(cyclopentadienyl)titanium compounds, a component for the hydrogenation catalyst contemplated by the present invention, and reducing organic metal compounds possess an ability to hydrogenate the unsaturated double bonds in low molecular weight organic compounds [from the publications such as M. F. Sloan et al. J. Am. Chem. Soc., Vol. 85, pp 4014–4018 (1965) and Y. Tajima et al. J. Org. Chem., Vol 33, pp 1689–1690 (1968), for example]. These catalysts, however, are regarded as commercially less advantageous than the aforementioned Ziegler type hydrogenation catalysts of (1) currently finding utility in commercial productions because they have lower hydrogenation activity and consequently are required to be used in larger quantities under conditions of higher temperature and higher pressure to provide amply high hydrogenation. No existing literature contains any report on application of such catalysts to polymers, particularly conjugated diene type polymers and copolymers of conjugated dienes and vinyl-substituted aromatic hydrocarbons. Absolutely nothing has been known about a catalyst providing a selective hydrogenation between the unsaturated double bons in conjugated diene units and the aromatic nucleus portion in such polymers. Such titanium compounds, when used alone, have no hydrogenating activity. Use of a titanium compound as a reducing organic metal compound in a living polymer has never been known to the art. Any technique suggesting such use of a titanium compound has never been disclosed to the art.

To the existing technical standard of such level as described above, it is surprising that this invention has realized selective hydrogenation of the unsaturated double bonds in conjugated diene units of the polymer in a low application rate under mild conditions.

In one aspect, this invention effects the hydrogenation on a living polymer containing a reducing lithium atom. This aspect of the invention has characteristic advantages such as enabling the hydrogenation to occur and proceed by using a bis-(cyclopentadienyl)titanium compound alone in a small amount in the reaction system, enabling required replenishment of the catalyst supply to be effected by addition of only one catalyst component, enjoying a higher catalytic activity than in a system using a bis-(cyclopentadienyl)titanium compound plus a reducing organic compound such as an alkyl aluminum compound and displaying notably high selective hydrogenation on the unsaturated double bonds in conjugated diene units, and enabling the polymer in its freshly formed, unisolated state to be immediately hydrogenated and thereby allowing the lithium remaining therein as a residue from the polymerization catalyst to be utilized as a component for the hydrogenation catalyst. Thus, the living polymer can be efficiently and economically hydrogenated by the present invention. This is really an unexpected result.

Although this invention can be applied to all hydrocarbon polymers containing unsaturated double bonds, it is preferably applied to conjugated diene polymers obtained by polymerizing or copolymerizing conjugated dienes. It is further applicable to living hydrocarbon polymers polymerized in the presence of an organic lithium compound and containing unsaturated double bonds and to living polymers of conjugated dienes obtained by polymerizing or copolymerizing conjugated dienes and containing lithium atoms in the polymer chains. These conjugated diene polymers and conjugated diene living polymers include homopolymers of conjugated dienes, interpolymers of different conjugated dienes, and copolymers obtained by copolymerizing at least one conjugated diene and at least one olefin monomer copolymerizable with that conjugated diene. The conjugated dienes which are usable for the production of such conjugated diene polymers and conjugated diene living polymers are generally conjugated dienes having four to about 12 carbon atoms. Concrete examples of such conjugated dienes are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, and 3-butyl-1,3-octadiene. With a view to producing elastomers excelling in physical properties and permitting industrially advantageous developments, 1,3-butadiene and isoprene prove to be particularly desirable conjugated dienes. Such elastomers as butadiene polymer, isoprene polymer, and butadiene/isoprene copolymer are particularly advantageous for the embodiment of this invention. These polymers are not particularly discriminated by microstructures of their polymer chains; they may be invariably used advantageously no matter what microstructures their polymer chains may possess. If these polymers do not have sufficient 1,2-vinyl bonds, however, their products of hydrogenation exhibit lower solubility than are desirable and the polymer themselves require use of specific solvents for uniform hydrogenation. Thus, the polymers are desired to contain the aforementioned bonds in an amount of at least about 30%.

The method of the present invention is used particularly advantageously for the hydrogenation of copolymers or living copolymers which are obtained by copolymerizing at least one conjugated diene and at least one monomer copolymerizable with that conjugated diene. Examples of the conjugated diene used advantageously for the production of such copolymer or living copolymer are those conjugated dienes enumerated above. As examples of the monomer used for copolymerization with the conjugated diene, all the monomers which are copolymerizable with conjugated dienes may be cited. Among the monomers satisfying this requirement, vinyl-substituted aromatic hydrocarbons are particularly desirable. To be more specific, for the purpose of obtaining commercially useful, highly valuable elastomers and thermoplastic elastomers by making the most of the effect of this invention in the selective hydrogenation of the unsaturated double bonds in conjugated diene units, copolymers of conjugated dienes and vinyl-substituted aromatic hydrocarbons are particularly important. Concrete examples of the vinyl-substituted aromatic hydrocarbon usable advantageously in the production of such copolymers include styrene, t-butyl styrene, α-methyl styrene, o-methyl styrene, p-methyl styrene, divinyl benzene, 1,1-diphenyl ethylene, vinyl naphthalene, N,N-dimethyl-p-aminoethyl styrene, and N,N-diethyl-p-aminoethyl styrene. Among the vinyl-substituted aromatic hydrocarbons, styrene proves especially advantageous. Concrete examples of the copolymer are butadiene/styrene copolymer and isoprene/styrene copolymer. These copolymers are the best choices because they give rise to hydrogenated copolymers of high industrial value.

These copolymers or living copolymers are desired to contain vinyl-substituted aromatic hydrocarbons in amounts in the range of 5% by weight to 95% by weight. If they contain vinyl-substituted aromatic hydrocarbons in any amount outside the range specified above, they do not easily acquire the characteristics inherent in thermoplastic elastomers.

The copolymers or living copolymers for which the method of this invention is intended embrace random copolymers having monomers thereof statistically distributed throughout the polymer chains thereof, tapered block copolymers, complete block copolymers, and graft copolymers. For the purpose of producing a commercially useful thermoplastic elastomer, block polymers containing at least one conjugated diene polymer block and at least one vinyl-substituted aromatic hydrocarbon polymer block are particularly important. In the block copolymers satisfying this requirement, those which contain vinyl-substituted aromatic hydrocarbon polymer blocks in amounts in the range of 10% by weight to 90% by weight based on the total weights of the polymers involved are particularly advantageous. These block copolymers do not easily produce thermoplastic elastomers or thermoplastic resins of good physical properties if their vinyl-substituted aromatic hydrocarbon polymer block contents fall outside the range specified above.

The vinyl-substituted aromatic hydrocarbon polymer block content (a) is determined by the method reported in L. M. Kolthoff et al, J. Polymer Sci., Vol. 1, page 429 (1946) and this content (a) is reported as the concentration of the block polymer in the whole amount of a polymer under test.

The aforementioned block polymer may be in a form having a small amount of vinyl-substituted aromatic hydrocarbon contained in a conjugated diene polymer block or having a small amount of conjugated diene in a vinyl-substituted aromatic hydrocarbon polymer block. Block copolymers of this class embrace block copolymers of the straight-chain type, the so-called branched type involving partial coupling with a coupling agent, the radial type, and the star-shaped type.

To be used particularly advantageously for the purpose of this invention, the aforementioned block copolymers or living block copolymers are desired to have conjugated diene units thereof in microstructures consisting of 30 to 70% by weight of 1,2-vinyl bonds and 70 to 30% by weight of 1,4-bonds (cis bonds and trans bonds). The block copolymers satisfying this requirement are commercially advantageous because the olefin portions of their products of hydrogenation exhibit good rubbery elasticity and the products of hydrogenation themselves show high solubility in solvents and possess low solution viscosity. Thus, they permit easy recovery of hydrogenated polymers and easy removal of spent solvents and warrant economic production of hydrogenated polymers.

The 1,2-vinyl bond content (b) in the conjugated diene units of the polymer is determined by the Hampton method [R. R. Hampton, Anal. Chem., Vol. 29, page 923 (1949)] using an infrared ray absorption spectrum, calculating the proportion of the 1,2-vinyl bonds to the conjugated diene units, and reporting this proportion in terms of weight ratio. The wave lengths used for this determination, in the case of a butadiene/styrene copolymer, are 724 cm$^{-1}$ for the cis-1,4 of butadiene, 967 cm$^{-1}$ for the trans-1,4, 911 cm$^{-1}$ for the 1,2-vinyl, and 699 cm$^{-1}$ for the styrene. By the use of these wavelengths, the concentrations of the individual components can be determined.

The polymers to be used in the hydrogenation by the method of this invention are not particularly discriminated by the molecular weights of such polymers. Generally, however, they are required to have number-average molecular weights in the range of about 1,000 to about 1,000,000. Polymers to be used are produced by any of the methods known to the art, such as, for example, the anionic polymerization method, the cationic polymerization method, the coordinated polymerization method, the radical polymerization method, the solution polymerization method, and the emulsion polymerization method. Among the polymers, living polymers obtained by using an organic lithium compound as a catalyst therefor and containing a lithium atom in the polymer chains thereof are particularly advantageous. As the polymerization catalyst in the manufacture of such living polymers, hydrocarbon compounds having at least one lithium atom bonded in the molecular units thereof are used. Examples of such hydrocarbon compounds are monolithium compounds such as n-propyl lithium, isopropyl lithium, n-butyl lithium, sec.-butyl lithium, tert.-butyl lithium, n-pentyl lithium, and benzyl lithium, and dilithium compounds such as 1,4-dilithio-n-butane, 1,5-dilithio-pentane, 1,2-dilithio-diphenyl ethane, 1,4-dilithio-1,1,4,4-tetraphenyl butane, 1,3- or 1,4-bis-(1-lithio-1,3-dimethylpentyl)-benzene, and 1,3- or 1,4-bis-(1-lithio-3-methyl pentyl)-benzene. The polymerization catalysts may be lithium oligomers and α,ω-dilithium oligomers which are obtained by such organic lithium compounds. Among the polymerization catalysts, n-butyl lithium and sec.-butyl lithium prove particularly popular. These organic lithium compounds may be used either singly or in the form of mixtures consisting of two or more members. Such a polymerization catalyst may be added to the reaction system all at once or separately in two or more divided portions during the course of the polymerization. The amount of such an organic lithium compound may be suitably selected depending on the molecular weight of the polymer desired to be obtained. Generally, this amount is in the range of 0.005 to 5 mol% based on the total amount of all monomers used.

In accordance with the present invention, the hydrogenation of a living polymer containing a lithium atom in the polymer chain thereof is effected by exposing the polymer to hydrogen in the presence of at least one titanium compound, as a catalyst (A), of the general formula,

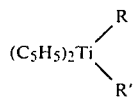

(wherein R and R' represent identical or unidentical groups selected from the class consisting of $C_1$–$C_8$ alkyl groups or alkoxy groups, $C_6$–$C_8$ aryl, aryloxy, aralkyl, and cycloalkyl groups, halogen groups, and a carbonyl group) or in the presence of at least one organic lithium compound, as a catalyst (B), in addition to the aforementioned at least one catalyst (A). The hydrogenation of a polymer other than the aforementioned living polymer is effected by exposing the polymer to hydrogen in the presence of the aforementioned catalysts (A) and (B). In the above definition of the catalyst (A), when R, R' are alkyl groups or alkoxy groups, it is preferred that these groups have from 1 to 4 carbon atoms.

Concrete examples of the bis-(cyclopentadienyl)-titanium compound to be used as the catalyst (A) in the hydrogenation according to the present invention include bis-(cyclopentadienyl)titanium dimethyl, bis-(cyclopentadienyl)titanium diethyl, bis-(cyclopentadienyl)-titanium di-n-butyl, bis-(cyclopentadienyl)titanium di-sec.-butyl, bis-(cyclopentadienyl)titanium dimethoxide, bis-(cyclopentadienyl)titanium diethoxide, bis-(cyclopentadienyl)titanium dibutoxide, bis-(cyclopentadienyl)titanium diphenyl, bis-(cyclopentadienyl) titanium diphenoxide, bis-(cyclopentadienyl)titanium difluoride, bis-(cyclopentadienyl)titanium dichloride, bis-(cyclopentadienyl)titanium dibromide, bis-(cyclopentadienyl)titanium diiodide, bis-(cyclopentadienyl)-titanium dicarbonyl, bis-(cyclopentadienyl)titanium chloride methyl, bis-(cyclopentadienyl)titanium chloride ethoxide, and bis-(cyclopentadienyl)titanium chloride phenoxide. No matter whether these compounds as the catalyst (A) are used alone or in the form of mixtures, the method of this invention effectively provides selective hydrogenation of the unsaturated double bonds in conjugated diene units of the polymer. In the titanium compounds enumerated above, those which effect desired hydrogenation of polymers at lower rates of application and warrant highly selective hydrogenation of the unsaturated double bonds in conjugated diene units under mild conditions are bis-(cyclopentadienyl)titanium dimethyl, bis-(cyclopentadienyl)-titanium di-n-butyl, bis-(cyclopentadienyl)titanium dichloride, and bis-(cyclopentadienyl)titanium dicarbonyl. Most of these titanium compounds are generally unstable and decomposable in air, oxygen, light, and heat and, therefore, must be handled under inert atmospheres in commercial use and stored in cool, dark rooms. Exceptionally, bis-(cyclopentadienyl)titanium dichloride exhibits high stability and excels in polymer hydrogenating activity and selectivity of the hydrogenation and, therefore, proves most advantageous.

The hydrogenation to be effected by the method of this invention requires the presence in the reaction system of an organic metal compound capable of reducing the catalyst (A), namely bis-(cyclopentadienyl)titanium compound, in addition to this catalyst (A). Examples of the organic metal compound capable of reducing the catalyst (A) are organic lithium compounds, organic aluminum compounds, organic zinc compounds, and organic magnesium compounds. By using these organic metal compounds alone or in the form of mixtures, the hydrogenation of polymer can be effectively carried out. For the method of the present invention to effect the hydrogenation of a polymer more actively than the known Ziegler type polymer hydrogenation catalyst and ensure selective hydrogenation of the unsaturated double bonds in conjugated diene units of the polymer, it is required to use the aforementioned organic lithium compound, as a catalyst (B), and/or a living polymr containing a lithium atom in the polymer chain thereof. To be more specific, by using a bis-(cyclopentadienyl)-titanium compound as the catalyst (A) in combination with an organic lithium compound as the catalyst (B) and/or a living polymer containing a lithium atom in the polymer chain thereof, the objects of this invention can be advantageously accomplished and, even at a low rate of application under mild conditions, substantially quantitative, preferential hydrogenation of the unsaturated double bonds in conjugated diene units of the polymer can be attained.

As the catalyst (B), a hydrocarbon compound containing at least one lithium atom is used. Desirable examples of such hydrocarbon compound are $C_1$–$C_{30}$ hydrocarbon lithium compounds and more desirable examples are alkyl lithium compounds represented by the general formula R"—Li (wherein R" denotes one of the alkyl groups of one to six carbon atoms). Concrete examples are monolithium compounds such as methyl lithium, ethyl lithium, n-propyl lithium, isopropyl lithium, n-butyl lithium, sec.-butyl lithium, isobutyl lithium, n-pentyl lithium, n-hexyl lithium, benzyl lithium, and styryl lithium, and dilithium compounds such as 1,4-dilithio-n-butane, 1,5-dilithio-pentane, 1,2-dilithio-diphenyl ethane, 1,4-dilithio-1,1,4,4-tetraphenyl butane, 1,3- or 1,4-bis-(1-lithio-1,3-dimethylpentyl)benzene, and 1,3- or 1,4-bis-(1-lithio-3-methylpentyl)benzene. Further, oligomers and polymers which are obtained by polymerization using such lithium compounds and, therefore, contain a lithium atom may be advantageously used as the catalyst (B). These hydrocarbon compounds may be used in the form of mixtures of two or more members or in the form of complexes consisting of two or more members. n-Butyl lithium exhibits high polymer hydrogenating activity and provides highly selective hydrogenation of the unsaturated double bonds in conjugated diene units of the polymer.

In the hydrogenation of a living polymer containing a lithium atom in the polymer chain thereof, which constitutes the most desirable, characteristic embodiment of the present invention, since the living polymer itself possesses an ability to reduce the catalyst (A), the hydrogenation can be efficiently and advantageously carried out by using the catalyst (A) alone without the use of the catalyst (B). Of course, this hydrogenation may be carried out by using the two catalysts, (A) and (B), in combination.

The hydrogenation contemplated by this invention is desirably carried out in a solution of a given polymer in an inert organic solvent and is more desirably carried out by using a polymer solution obtained by polymerizing a conjugated diene, for example, in an inert solvent to be continuously utilized in the subsequent reaction of hydrogenation. The term "inert organic solvent" means a solvent which does not react with any of the substances participating in the reactions of polymerization and hydrogenation. Examples of desirable solvents are aliphatic hydrocarbons such as n-pentane, n-hexane, n-heptane, and n-octane, alicyclic hydrocarbons such as cyclohexane and cycloheptane, and ethers such as diethyl ether and tetrahydrofuran. These solvents may be used either alone or in the form of mixtures. Such aromatic hydrocarbons as benzene, toluene, xylene, and ethyl benzene are usable only when the aromatic double bonds are not hydrogenated under selected conditions of hydrogenation.

The hydrogenation of the present invention is carried out on a given polymer in a concentration of 1 to 50% by weight, preferably 3 to 25% by weight, based on the amount of the solvent to be used. When the hydrogenation is carried out on a living polymer, it is essential that the living polymer subjected to the hydrogenation should retain lithium intact and should not be totally inactivated by water or some other foreign matter present in the solvent.

The hydrogenation of the present invention is generally accomplished by keeping the polymer solution at a prescribed temperature, adding the hydrogenation catalyst to the polymer solution while under agitation or no agitation, subsequently feeding hydrogen gas into the polymer solution, and increasing the ambient pressure to a prescribed level.

The aforementioned catalysts, (A) and (B), may be directly added to the polymer solution. Otherwise, they may be added as preparatorily dissolved in such inert organic solvents as enumerated above. The addition in the form of solutions is more advantageous for the purpose of enabling the hydrogenation to proceed uniformly and quickly.

Where the hydrogenation is carried out by using both the catalysts, (A) and (B), the two catalysts (A) and (B) may be mixed and, in the mixed form, reduced and added to the polymer solution. They may be separately added to the polymer solution, one after the other. Otherwise, they may be simultaneously added to the polymer solution. When necessary, these catalysts, (A) and (B), may be additionally incorporated into the reaction system during the course of hydrogenation. For the purpose of causing the hydrogenation to proceed quickly, it is desirable that the catalysts, (A) and (B), should be mixed in a prescribed ratio and, in the mixed state, reduced and then added to the polymer solution.

It is essential that the catalysts, (A) and (B), should be handled under an inert atmosphere. The term "inert atmosphere" means an atmosphere of helium, neon, or argon, for example, which does not react with any of the substances participating in the reaction of hydrogenation. Air and oxygen are poor choices because they oxidize or decompose the hydrogenation catalyst and entail inactivation of the catalyst. Nitrogen may be used where either the catalyst (A) or the catalyst (B) is used independently. Where these two catalysts, (A) and (B), are mixed or where they are used in combination, nitrogen acts as a catalytic poison and impairs the hydrogenation activity. Thus, nitrogen is a poor choice in this situation. Where the catalysts, (A) and (B), are preparatorily mixed and, in the mixed state, put to use, therefore, the hydrogenation can be carried out most advantageously in an atmosphere of hydrogen gas. For the purpose of maximizing the hydrogenating activity and enabling the hydrogenation of a polymer to proceed quickly and uniformly, the addition of the catalyst to the polymer solution is effected most advantageously under an atmosphere of hydrogen gas.

When the hydrogenation by the method of this invention is performed on a living polymer containing a lithium atom in the polymer chain, this hydrogenation is carried out in the presence of the catalyst (A) or the catalyst (B) in combination with the catalyst (A). Most preferably, this hydrogenation is carried out in the presence of the catalyst (A) alone. The amount of the catalyst to be added to the polymer solution, computed as the amount of the catalyst (A), is desired to fall in the range of 0.005 to 10 millimoles per 100 g of the amount of the living polymer. So far as the amount of the added catalyst falls in this range, the hydrogenation can be preferentially effected on the unsaturated double bonds in conjugated diene units of the living polymer without substantially entailing hydrogenation of the aromatic nucleus double bonds. Thus, extremely high selectivity of hydrogenation is realized. Even if the catalyst is added in an amount exceeding 10 millimoles, the living polymer may be hydrogenated. Use of the catalyst in such a high concentration is not prohibited. When the catalyst is added in excess of 10 millimoles, the excess catalyst does not go to appreciably increasing the effect of the catalyst in the hydrogenation. This excess catalyst not only jeopardizes the economy of the hydrogenation but also entails extra work such as deliming and removal of residual catalyst from the hydrogenation product possibly to the extent of complicating the whole process. When the catalyst is added in an amount not exceeding 0.005 millimole, it tends to be inactivated by the foreign matter and does not enable the hydrogenation to proceed smoothly. Preferably, the amount of the catalyst added to the polymer solution, calculated in terms of the weight of the catalyst (A), is in the range of 0.01 to 2 millimoles per 100 g of the living polymer.

In the hydrogenation of a living polymer, the ratio of the number of moles of lithium in the living polymer or the sum of the number of moles of lithium in the living polymer and the number of moles of lithium in the catalyst (B) to the number of moles of titanium in the catalyst (A) (hereinafter referred to as "living Li/Ti molar ratio") also affects the hydrogenation activity. The lithium content of the living polymer varies with the molecular weight of the living polymer, the number of functional groups in the organic lithium compound used in the polymerization catalyst, and the ratio of inactivation of living lithium. Where the hydrogenation is carried out by using the catalyst (A) alone, the living Li/Ti molar ratio is fixed depending on the amount of the catalyst (A) to be added. For the purpose of ensuring high hydrogenating activity and realizing highly selective hydrogenation of the unsaturated double bonds in conjugated diene units, the living Li/Ti molar ratio is desired to fall in the range of 0.1 to 100. The living Li/Ti molar ratio falling in the range of 2 to 20 proves most desirable because the catalyst satisfying this living Li/Ti molar ratio permits notable improvement of the hydrogenating activity. To realize this particular living Li/Ti molar ratio, it may be necessary to have part of the living polymer preparatorily inactivated by the use of water, alcohol, or a halogenide or to add an organic lithium compound, such as a catalyst (B) to the living polymer before the hydrogenation is started, so as to adjust the lithium concentration in the living polymer.

In the hydrogenation of a polymer other than a living polymer having a lithium atom in the polymer chain thereof, which is another preferred embodiment of this invention, it is essential to use a catalyst (A) and a catalyst (B) in combination. In this case, the mixing ratio of the catalyst (A) to the catalyst (B) is desired to be such that the ratio of the number of moles of lithium in the catalyst (B) to the number of moles of titanium in the catalyst (A) (hereinafter referred to as "Li/Ti molar ratio") may fall in the range of about 0.5 to about 20. If the Li/Ti molar ratio is less than about 0.5, the combined catalyst fails to manifest the hydrogenation activity sufficiently. If it is more than about 20, there occurs an excess of expensive catalyst (B) which makes substantially no contribution to the improvement of the activity and proves wasteful. Moreover, the excess catalyst is not advantageous because it tends to induce gelation of the polymer and unwanted secondary reactions. The Li/Ti molar ratio in the range of 2 to 6 is particularly advantageous because the combined catalyst contributes notably to the improvement of the hydrogenating activity. Of course, the Li/Ti molar ratio can be suitably selected depending on the other conditions of hydrogenation separately selected.

When the hydrogenation of a polymer other than a living polymer is carried out in the presence of the combined catalyst of the catalyst (A) and the catalyst (B), the amount of the combined catalyst which is sufficient for addition to the reaction system, as computed in terms of the amount of the catalyst (A), is in the range of 0.05 to 20 millimoles per 100 g of the polymer under treatment. So far as the amount falls in this range, the hydrogenation can be preferentially effected on the unsaturated double bonds in conjugated diene units of the polymer and substantially no hydrogenation occurs on the aromatic nucleus double bonds. Thus, the combined catalyst realizes very high selectivity in the hydrogenation.

The hydrogenation proceeds without any hindrance even when the combined catalyst is added in excess of the upper limit of 20 millimols. The excess catalyst, however, proves to be mere waste and entails a disadvantage that the residue of catalyst after the hydrogenation calls for troublesome extra steps of decalcination and removal. To ensure quantitative hydrogenation of the unsaturated double bonds in conjugated diene units of the polymer under selected conditions of hydrogenation, the amount of the combined catalyst to be added is desired to fall in the range of 0.1 to 5 millimoles, again in terms of the amount of the catalyst (A), per 100 g of the polymer. Where the catalyst (A) and the catalyst (B) are mixed in advance of the addition to the reaction system, the preparation of this combined catalyst is desired to take place immediately before the hydrogenation. When the prepared combined catalyst is stored under an inert atmosphere, however, it retains the polymer hydrogenating activity virtually intact even at room temperature for a period of about one week.

The hydrogenation conducted in accordance with the present invention is carried out by the use of elementary hydrogen. Preferably, the elementary hydrogen is introduced in a gaseous state into the polymer solution. The hydrogenation is desired to be carried out under continued agitation of the polymer solution, because the agitation serves to provide ample and quick contact of the introduced hydrogen with the polymer. Generally, the hydrogenation is carried out at temperatures in the range of $-20°$ C. to $150°$ C. If the hydrogenation is performed at temperatures not exceeding $-20°$ C., it proves uneconomical because the activity of the catalyst is less than is normally obtained and the hydrogenation itself proceeds at a lower rate than is desirable and the amount of the catalyst is larger than is normally required. At such lower temperatures, the polymer under hydrogenation tends to be insolubilized and precipitated in the solution. If the hydrogenation is carried out at temperatures exceeding $150°$ C., the catalyst tends to be inactivated and the polymer to be decomposed or gelled and the hydrogenation tends to occur additionally on the aromatic nucleus portion of the polymer. Thus, at such higher temperatures, the selectivity of hydrogenation is impaired. Preferably, the temperatures of hydrogenation are in the range of $20°$ to $80°$ C.

Although the pressure of the hydrogen to be used for the hydrogenation of the polymer is not specifically defined, it is desired to fall in the range of 1 to 100 kg/cm$^2$. If this pressure falls short of the lower limit of 1 kg/cm$^2$, the speed of hydrogenation falls substantially to the lowest possible limit, making desired improvement in the hydrogenation conversion infeasible. If the pressure exceeds the upper limit of 100 kg/cm², the hydrogenation is substantially terminated as soon as the temperature is elevated. Thus, such high temperatures deprive the hydrogenation of its significance and entail a disadvantage that unwanted secondary reactions and gelation are induced. Preferably, the pressure of the hydrogen for the hydrogenation falls in the range of 2 to 30 kg/cm². Actually, the optimum pressure of the hydrogen is selected in relation to the conditions of hydrogenation such as the amount of the catalyst to be added. Actually, the pressure of the hydrogen is desired to be selected in the portion of the aforementioned range increasingly near the upper limit side in proportion as the amount of the catalyst for hydrogenation decreases.

The duration of the hydrogenation effected by this invention generally falls in the range of several seconds to 50 hours. It is suitably selected within the range just described according to the other conditions for hydrogenation separately selected.

The hydrogenation of the present invention can be carried out by any of the known methods, such as the batch method and the continuous method. The progress of the hydrogenation can be comprehended throughout the whole course of hydrogenation by tracing the amount of hydrogen absorbed by the polymer solution.

By the method of this invention, there can be obtained a hydrogenated polymer in which at least 50%, preferably at least 90%, of the unsaturated double bonds in conjugated diene units of the polymer have undergone hydrogenation. Where the hydrogenation is carried out more desirably on a copolymer of a cojugated diene and a vinyl-substituted aromatic hydrocarbon, there can be obtained a hydrogenated polymer in which at least 50%, preferably at least 90%, of the unsaturated double bonds in conjugated diene units of the polymer have undergone hydrogenation and not more than 10% of the aromatic nucleus portion of the polymer has undergone selective hydrogenation. If the hydrogenation conversion of the conjugated diene units falls short of 50%, the effect of hydrogenation in the improvement of weatherability, resistance to oxidation, and heat resistance is not sufficient. In the case of a copolymer of a conjugated diene and a vinyl-substituted aromatic hydrocarbon, no noticeable effect in the improvement of physical properties is recognized even if the aromatic nucleus portion is hydrogenated. Particularly in the case of a block copolymer, the inherently excellent processability and moldability are impaired. Further, the hydrogenation of the aromatic nucleus portion consumes a large amount of hydrogen and the hydrogenation itself is required to be carried out at elevated temperatures under increased pressure for a long time. Thus, the hydrogenation proves economically infeasible. The catalyst of the present invention for the hydrogenation of a polymer enjoys very high selectivity and substantially precludes hydrogenation of the aromatic nucleus portion of the polymer and, therefore, proves highly advantageous from the economic point of view.

The aforementioned hydrogenation conversion of a polymer can be determined by the measurement of an ultraviolet ray absorption spectrum and an infrared ray absorption spectrum where the polymer contains an aromatic nucleus portion and by the measurement of an infrared ray absorption spectrum where the polymer contains no aromatic nucleus portion. To be specific, the hydrogenation conversion of the aromatic nucleus portion is determined by measuring the content of the aromatic nucleus portion in the polymer based on the absorption of the aromatic nucleus portion (250 mμ for styrene, for example) in the ultraviolet ray absorption spectrum and applying the result of this measurement to the following formula.

$$\text{Hydrogenation conversion (\%) of the aromatic nucleus portion of the polymer} = \left(1 - \frac{\text{Aromatic nucleus content in polymer after the hydrogenation}}{\text{Aromatic nucleus content in polymer before the hydrogenation}}\right) \times 100$$

The hydrogenation conversion of the conjugated diene units is determined in accordance with the concentration ratio (r) of the unsaturated portion or the portion of conjugated diene units (total of the cis, trans, and vinyl bonds) to the aromatic nucleus portion in the polymer found by the aforementioned Hampton method from the infrared ray absorption spectrum and the aromatic nucleus contents before and after the hydrogenation as found based on the ultraviolet ray absorption spectrum.

$$r = \frac{\text{Conjugated diene unit content in the polymer after the hydrogenation}}{\text{Aromatic nucleus content in the polymer after the hydrogenation}}$$

Hydrogenation conversion of conjugated diene units (%) in the polymer =

$$\left(1 - \frac{\text{Conjugated diene unit content in the polymer after the hydrogenation}}{\text{Conjugated diene unit content in the polymer before the hydrogenation}}\right) \times 100 =$$

$$\left[1 - \frac{r \times \left(\text{Aromatic nucleus content after the hydrogenation}\right)}{1 - \left(\text{Aromatic nucleus content before the hydrogenation}\right)}\right] \times 100$$

From the polymer solution which has undergone the hydrogenation by the method of this invention, the residual catalyst may be removed when necessary and, thereafter, the hydrogenated polymer can be easily isolated. For example, the isolation of the hydrogenated polymer can be effected by a method which comprises adding to the resultant reaction solution a polar solvent such as acetone or alcohol which serves as a poor solvent for the hydrogenated polymer thereby causing precipitation of the polymer, a method which comprises pouring hot water while under agitation into the reaction solution and thereafter recovering the hydrogenated polymer in conjunction with the solvent by distillation, or a method which comprises directly heating the reaction solution thereby expelling the solvent by distillation. The method of hydrogenation contemplated by the present invention is characterized by the fact that the amount of the catalyst used for the hydrogenation is small. When the catalyst spent in the hydrogenation is allowed to remain in its unmodified form in the hydrogenated polymer, it exerts no appreciable effect upon the physical properties of the polymer.

Further, the bulk of the spent catalyst is decomposed and removed from the hydrogenated polymer during the isolation of the hydrogenated polymer. The extra work otherwise necessary for deliming and removal of the residual catalyst, therefore, can be dispensed with. Thus, the hydrogenation of the polymer can be carried out with a very simple process.

As described above, the present invention enables the conjugated diene polymer to be hydrogenated in the presence of a small amount of a highly active catalyst under mild conditions and particularly permits the unsaturated double bonds in conjugated diene units of a copolymer of a conjugated diene and a vinyl-substituted aromatic hydrocarbon to be hydrogenated with extremely high selectivity. By the method of this invention, practically all conjugated diene polymers can be hydrogenated. Particularly in the hydrogenation of a living polymer containing a lithium atom in the polymer chain thereof, the hydrogenation can be carried out continuously in the same reaction vessel as used for the production of the polymer in the previous stage, use of a catalyst consisting solely of a component suffices for the hydrogenation, use of this catalyst in a very small amount ensures high hydrogenating activity because the lithium remaining in the polymer from the previous stage of polymerization functions quite effectively in reducing the catalyst (A) and enhancing the hydrogenating activity, and the troublesome extra work otherwise necessary for the deliming and removal of residual catalyst after the hydrogenation can be dispensed with. Thus, the hydrogenation of this living polymer can be carried out efficiently by an economical and simple process. This invention, accordingly, is highly valuable from the economic point of view.

The hydrogenated polymers which are obtained by the method of this invention are used as elastomers, thermoplastic elastomers, or thermoplastic resins which excel in resistance to weather conditions and to oxidation. By incorporation of various additives such as ultra-violet ray absorbents, oil, and fillers or by mixture with other elastomers and resins, the hydrogenated polymers find extensive utility in various applications of very high commercial importance.

Now, the present invention will be described specifically below with reference to working examples. These examples, cited by way of illustration, are not meant to limit the present invention in any sense.

Typical procedures followed in the synthesis of the various polymers used in these working examples are shown below as referential examples.

REFERENTIAL EXAMPLE 1

In an autoclave having an inner volume of 2 liters, 500 g of cyclohexane, 100 g of 1,3-butadiene monomer, and 0.05 g of n-butyl lithium were placed and then stirred and heated to 60° C. for three hours to polymerize the monomers and synthesize living polybutadiene. The living polybutadiene thus obtained contained 0.67 millimole of living lithium per 100 g of the polymer. A portion of this living polymer was isolated and analyzed. It was found to contain 13% of 1,2-vinyl bonds and have a number-average molecular weight of about 150,000 as measured by the GPC.

REFERENTIAL EXAMPLE 2

The procedure of Referential Example 1 was repeated, except that isoprene was used in the place of 1,3-butadiene. Consequently, there was obtained living polyisoprene containing 0.66 millimole of living lithium per 100 g of the living polymer, having 10% of 1,2-vinyl bonds, and possessing a number-average molecular weight of about 150,000.

REFERENTIAL EXAMPLE 3

The procedure of Referential Example 1 was repeated, except that tetrahydrofuran was further added in an amount 40 mole times the amount of n-butyl lithium, to produce living polybutadiene. This living polymer had 0.66 millimole of living lithium per 100 g of the polymer, 43% of 1,2-vinyl bonds, and a number-average molecular weight of about 150,000.

REFERENTIAL EXAMPLE 4

In an autoclave, 400 g of cyclohexane, 70 g of 1,3-butadiene monomer, 30 g of styrene monomer, 0.03 g of n-butyl lithium, and 0.9 g of tetrahydrofuran were placed all at once and heated at 40° C. for two hours to induce polymerization of the monomers.

The polymer thus obtained was a perfectly random living copolymer of butadiene/styrene. It was found to contain 0.48 millimole of living lithium per 100 g of the polymer, have 50% of 1,2-vinyl bond content in the butadiene units, and possess a number-average molecular weight of about 200,000.

REFERENTIAL EXAMPLE 5

In an autoclave, 400 g of cyclohexane, 15 g of styrene monomer, and 0.11 g of n-butyl lithium were placed and then heated at 60° C. for three hours to polymerize the monomers. Subsequently, the resultant reaction solution and 70 g of 1,3-butadiene monomer newly added thereto were heated at 60° C. for three hours to induce polymerization of the monomers. Finally, the resultant reaction solution and 15 g of styrene monomer added thereto were heated at 60° C. for three hours. Consequently, there was obtained a styrene-butadiene-styrene type living block copolymer having a bound styrene content of 30%, a block styrene content of 29.5%, a 1,2-vinyl bond content of 13% in the butadiene units (9% based on the total of polymer), and a number-average molecular weight of about 60,000. This polymer contained 1.65 millimoles of living lithium per 100 g of the polymer.

REFERENTIAL EXAMPLE 6

The procedure of Referential Example 5 was repeated, except that the two amounts of styrene monomer added were each 40 g (80 g in total) and the amount of 1,3-butadiene monomer was changed to 20 g. Consequently, there was synthesized a living block copolymer having a high styrene content. The styrene-butadiene-styrene type living block copolymer thus obtained had a bound styrene content of 80%, a block styrene content of 78%, a 1,2-vinyl bond content of 15% (3% based on the total of polymer) in the butadiene units, and a number-average molecular weight of about 60,000. This copolymer contained 1.65 millimoles of living lithium per 100 g of the polymer.

REFERENTIAL EXAMPLE 7

The procedure of Referential Example 5 was repeated, except that tetrahydrofuran was further added in an amount 35 mole times the amount of n-butyl lithium. Consequently, there was synthesized a styrene-butadiene-styrene type living block polymer having a bound styrene content of 30%, a block styrene content of 25%, a 1,2-vinyl bond content of 38% in the butadiene units, and a number-average molecular weight of about 60,000. This polymer contained 1.65 millimoles of living lithium per 100 g of the polymer.

REFERENTIAL EXAMPLE 8

Into a reactor having an inner volume of 1 liter and a height/diameter ratio of 4, and provided with an agitator, 1200 g/hr of cyclohexane, 210 g/hr of 1,3-butadiene monomer, 1.33 g/hr of n-butyl lithium (n-BuLi), and tetrahydrofuran (THF) (n-BuLi/THF=30 mol ratio) were continuously fed via the bottom of the reactor. Via the top of the reactor, 90 g/hr of styrene monomer was fed. The reaction system was held at a polymerization temperature of 100° C., with an average retention time of 25 minutes. A living polymer solution was continuously withdrawn from the reactor.

The living copolymer thus obtained had a butadiene-styrene type structure. It was found to have a bound styrene content of 30%, a block styrene content of 10.2%, a 1,2-vinyl bond content of 40% (28% based on the total of polymer) in the butadiene units, and a number-average molecular weight of about 180,000. This polymer contained 0.55 millimole of living lithium per 100 g of the polymer.

REFERENTIAL EXAMPLE 9

In an autoclave, 400 g of cyclohexane, 13 g of 1,3-butadiene monomer, 0.15 g of n-butyl lithium and an amount of tetrahydrofuran corresponding in molar ratio to n-BuLi/THF=40 were added and then heated at 70° C. for 45 minutes to polymerize the monomers. The resultant polymer solution and 20 g of styrene monomer newly added thereto were heated for 30 minutes. Subsequently, the resultant polymer solution and 47 g of 1,3-butadiene monomer added thereto were heated for 75 minutes. Finally, the resultant polymer solution and 20 g of styrene monomer added thereto were heated for 30 minutes. Consequently, there was synthesized a butadiene-styrene-butadiene-styrene type living block polymer.

This polymer had a bound styrene content of 40%, a block styrene content of 33%, a 1,2-vinyl bond content of 35% (30% based on the total of polymers) in the butadiene units, and a number-average molecular weight of about 60,000. It contained 1.65 millimoles of living lithium per 100 g of the living polymer.

REFERENTIAL EXAMPLE 10

The procedure of Referential Example 5 was repeated, except that isoprene was used in the place of 1,3-butadiene. Consequently, there was synthesized a styrene-isoprene-styrene type living block copolymer.

This copolymer contained 1.65 millimoles of living lithium per 100 g of the living polymer. It was found to have a bound styrene content of 30%, a block styrene content of 29.5%, a 1,2-vinyl bond content of 10% (7% based on the total of polymer) in the isoprene units, and a number-average molecular weight of about 60,000.

REFERENTIAL EXAMPLE 11

A mixture of 500 g of cyclohexane with 30 g of styrene monomer and 0.45 g of n-butyl lithium was heated at 60° C. for three hours to polymerize the monomers. The resultant polymer solution and 70 g of 1,3-butadiene monomer and an amount of tetrahydrofuran corresponding in molar ratio to a n-BuLi/THF=20 added thereto were heated at 40° C. for two hours to polymerize the monomers. Thereafter, silicon tetrachloride was added in an amount ¼ in molar ratio of the amount of the catalyst used to effect coupling. Consequently, there was synthesized a (styrene/butadiene)$_n$-Si type block polymer.

The block polymer thus obtained had already lost the living lithium. It was found to have a bound styrene content of 30%, a 1,2-vinyl bond content of 50% (35% based on the total of polymers) in the butadiene units, and a number-average molecular weight of about 60,000.

REFERENTIAL EXAMPLE 12

In a cyclohexane solution containing 0.5 mole of sec-butyl lithium, 0.5 mole of triethylamine was added and agitated at room temperature for one hour. Then to the resultant solution, 0.25 mole of m-diisopropenyl benzene was added dropwise while under agitation at room temperature over a period of three hours. The resultant solution was further agitated for 24 hours at room temperature. Consequently, there was obtained a cyclohexane solution of 1,3-bis-(1-lithio-1,3-dimethylpentyl)benzene. This dilithium had a purity of 98.7% and an active lithium concentration of 200 millimoles/g.

In an autoclave, 400 g of cyclohexane, 70 g of 1,3-butadiene monomer, and 1.40 g of the dilithium catalyst solution prepared as described above (having an active lithium content of 2.80 millimoles) were placed and then heated at 60° C. for three hours to polymerize the monomer. Then, the resultant reaction solution and 30 g of styrene monomer added thereto were heated at 60° C. for three hours to polymerize the monomers. Consequently, there was obtained a styrene-butadiene-styrene type di-living block polymer having a bound styrene content of 30%, a block styrene content of 29%, a 1,2-vinyl bond content of 20% in the butadiene units, and a number-average molecular weight of about 80,000. This polymer contained 2.50 millimoles of living lithium per 100 g of the polymer.

REFERENTIAL EXAMPLE 13

In an autoclave, 400 g of cyclohexane, 100 g of 1,3-butadiene monomer, and 20.0 g of the cyclohexane solution of 1,3-bis-(1-lithio-1,3-dimethylpentyl)benzene (having an active lithium content of 40 millimoles) indicated in Referential Example 12 were placed and polymerized at 60° C. for three hours under stirring to synthesize di-living polybutadiene. This polymer had a number-average molecular weight of about 6,000 and a 1,2-vinyl bond content of 35%. It contained 33.0 millimoles of living lithium per 100 g of the polymer.

EXAMPLES 1–12

[Hydrogenation of living polymers with $(C_5H_5)_2TiCl_2$]

The living polymer solutions obtained in Referential Examples 1, 2 were diluted with preparatorily refined and dried toluene and the living polymer solutions obtained in Referential Examples 3–10, 12, and 13 were diluted with preparatorily refined and dried cyclohexane, each to a living polymer concentration of 5% by weight. The diluted polymer solutions were subjected to hydrogenation.

In a thoroughly dried autoclave having an inner volume of 2 liters and provided with an agitator, a 1000 g portion of each of the aforementioned living polymer solutions (containing 50 g of living polymer) was placed, deaerated under a vacuum, displaced with hydrogen, and kept at 40° C. under stirring.

In an autoclave, 20.0 ml of a toluene solution containing bis-(cyclopentadienyl)titanium dichloride in a concentration of 1.0 millimole/100 ml (total catalyst content of 0.20 millimole) was added as a catalyst for hydrogenation and dried gaseous hydrogen was fed in under a pressure of 5.0 kg/cm$^2$ and the contents of the autoclave were agitated for two hours to undergo hydrogenation. Substantial absorption of hydrogen by the polymer solution was invariably completed within 30 minutes. The reaction solution thus obtained was homogeneous, slightly black to grayish black solution of low viscosity. The reaction solution was relieved of heat and pressure, removed from the autoclave, and diluted with a large volume of methanol to precipitate the polymer. The polymer was separated from this solution by filtration and dried. Consequently, there was obtained a white hydrogenated polymer. The conditions of the hydrogenation and the hydrogenation conversion and attributes of the produced hydrogenated polymer were as shown in Table I.

It is noted from Table I that all the polymers had their conjugated diene units quantitatively hydrogenated and their styrene units left substantially unhydrogenated and they exhibited excellent activity and selectivity.

autoclave, and diluted with a large volume of methanol to precipitate the polymer in the solution. The precipitated polymer was separated from the solution by filtration and dried. Consequently, there was obtained a white hydrogenated polymer. The hydrogenation conversions and the attributes of the hydrogenated polymers were as shown in Table II.

It is noted from Table II that the polymers had their conjugated diene units quantitatively hydrogenated and their styrene units left substantially unhydrogenated. They exhibited excellent activity and selectivity.

TABLE II

| Example | 13 | 14 | 15 | 16 | 17 | 18 | 19 |
|---|---|---|---|---|---|---|---|
| Sample No. (Referential Example No.) | 4 | 5 | 6 | 7 | 8 | 9 | 10 |
| [Living Li + n-BuLi]/Ti molar ratio | 4.2 | 4.8 | 4.8 | 4.8 | 4.2 | 4.8 | 4.8 |
| Hydrogenation conversion of butadiene units (%) | 97 | 100 | 99 | 99 | 99 | 99 | 98 |
| Hydrogenation conversion of styrene units (%) | <1 | <1 | <1 | <1 | <1 | <1 | <1 |
| Attribute of hydrogenated polymer | Soft elastomer | Rigid resin | | Flexible thermoplastic | | | Soft resin |

TABLE I

| Example | 1 | 2 | 3 | 4 | 5 | 6 | 7 | 8 | 9 | 10 | 11 | 12 |
|---|---|---|---|---|---|---|---|---|---|---|---|---|
| Sample No. (Referential Example No.) | 1 | 2 | 3 | 4 | 5 | 6 | 7 | 8 | 9 | 10 | 12 | 13 |
| Living Li/Ti molar ratio | 1.7 | 1.7 | 1.7 | 1.2 | 4.1 | 4.1 | 4.1 | 4.1 | 4.1 | 4.1 | 6.3 | 83 |
| Hydrogenation conversion of conjugated diene units (%) | 97 | 95 | 94 | 94 | 100 | 99 | 96 | 97 | 96 | 98 | 97 | 96 |
| Hydrogenation conversion of styrene units (%) | — | — | — | <1 | <1 | <1 | <1 | <1 | <1 | <1 | <1 | — |
| Attribute of hydrogenated polymer | Soft resin like | Soft elastomer-like | Rigid resin-like | Flexible thermoplastic elastomer | | | | | Soft resin-like | Rigid thermoplastic elastomer | Liquid resin-like | |

EXAMPLES 13-19

[Hydrogenation of living polymer with (C$_5$H$_5$)$_2$TiCl$_2$/n-BuLi]

In a throughly dried autoclave having an inner volume of 2 liters and provided with an agitator, a varying living polymer solution synthesized in Referential Examples 4-10 was placed in an amount containing 50 g of the polymer, replaced with dry hydrogen gas, and kept at 50° C. under stirring.

Then, 50 ml of a benzene solution containing bis-(cyclopentadienyl)titanium dichloride as a catalyst (A) in a concentration of 2.0 millimoles/100 ml and 10 ml of a cyclohexane solution containing n-butyl lithium as a catalyst (B) in a concentration of 40 millimoles/100 ml were mixed at 40° C. under a hydrogen pressure of 2.0 kg/cm$^2$. The combined catalyst thus produced was immediately added to the autoclave and dried gaseous hydrogen was fed in under a pressure of 5.0 kg/cm$^2$ and the contents of the autoclave were hydrogenated for two hours under stirring. Substantial absorption of hydrogen by the polymer was invariably completed within 30 minutes. The reaction solution consequently obtained was a slightly black to grayish black homogeneous solution of low viscosity. The reaction solution was relieved of heat and pressure, removed from the

EXAMPLES 20-27

[Hydrogenation of polymer other than living polymer with (C$_5$H$_5$)$_2$TiCl$_2$/n-BuLi]

Various living polymers were prepared by following the procedures of Referential Examples 4-11 (coupling polymer in Referential Example 11). The polymer solutions thus prepared were poured into large volumes of methanol to precipitate the respective polymers therein. The precipitated polymers were separated from the solutions by filtration, washed with methanol, and dried at 40° C. under reduced pressure for three days to afford various finished polymers. All these polymers had already lost living lithium.

A 100 g portion of each finished polymer was dissolved in preparatorily refined and dried cyclohexane to obtain a solution containing the polymer in a concentration of 10% by weight. This solution was placed in a dried autoclave having an inner volume of 2 liters and, after the interior of the autoclave had been displaced with hydrogen, the solution in the autoclave was kept at 50° C.

Then, 100 ml of a toluene solution containing bis-(cyclopentadienyl)titanium dichloride as a catalyst (A) in a concentration of 1.0 millimole/100 ml and 10 ml of a cyclohexane solution containing n-butyl lithium as a catalyst (B) in a concentration of 40 millimoles/100 ml were mixed (Li/Ti molar ratio=4.0) at 40° C. under a hydrogen pressure of 2.0 kg/cm². They were agitated at 40° C. for five minutes. The combined catalyst solution thus obtained was immediately placed in an autoclave provided with an agitator and dry hydrogen was fed in under a pressure of 5.0 kg/cm² and the contents of the autoclave were hydrogenated at 50° C. for two hours under stirring.

The reaction solution was treated by following the procedure of Example 1, to obtain a hydrogenated polymer. The hydrogenation conversions of the produced hydrogenated polymers were as shown in Table III.

living polymer (living Li/Ti molar ratio=3.3) and dry hydrogen gas was fed in under a pressure of 5.0 kg/cm² and the polymer was hydrogenated at 40° C. for one hour under stirring.

After the hydrogenation, the hydrogenated polymer was treated by following the procedure of Example 1 and then tested for attributes.

Separately by way of comparison, the hydrogenation described above was repeated by using a titanium compound other than a bis-(cyclopentadienyl)titanium compound. The results were as shown in Table IV.

TABLE IV

| Example | 28 | 29 | 30 | 31 | 32 |
|---|---|---|---|---|---|
| Hydrogenation catalyst species | Cp$_2$Ti(CH$_3$)$_2$ | Cp$_2$Ti(n-Bu)$_2$ | Cp$_2$Ti(OC$_2$H$_5$)$_2$ | Cp$_2$TiCl$_2$ | Cp$_2$TiBr$_2$ |
| Hydrogenation conversion of butadiene units (%) | 99 | 85 | 62 | 98 | 85 |
| Hydrogenation conversion of styrene units (%) | <1 | <1 | <1 | <1 | <1 |

| Example | 33 | 34 | Comparative Example 1 | Comparative Example 2 |
|---|---|---|---|---|
| Hydrogenation catalyst species | Cp$_2$Ti(CO)$_2$ | Cp$_2$Ti(CH$_3$)(Cl) | C$_2$H$_5$TiCl$_3$ | CpTiCl$_3$ |
| Hydrogenation conversion of butadiene units (%) | 100 | 97 | <1 | <1 |
| Hydrogenation conversion of styrene units (%) | <1 | <1 | <1 | <1 |

TABLE III

| Example | 20 | 21 | 22 | 23 | 24 | 25 | 26 | 27 |
|---|---|---|---|---|---|---|---|---|
| Sample | Finished product of Referential Example 4 | Finished product of Referential Example 5 | Finished product of Referential Example 6 | Finished product of Referential Example 7 | Finished product of Referential Example 8 | Finished product of Referential Example 9 | Finished product of Referential Example 10 | Finished product of Referential Example 11 |
| Hydrogenation conversion of conjugated diene units (%) | 94 | 96 | 100 | 97 | 96 | 96 | 96 | 95 |
| Hydrogenation conversion of styrene units (%) | <1 | <1 | <1 | <1 | <1 | <1 | <1 | <1 |

EXAMPLES 28–34 AND COMPARATIVE EXAMPLES 1, 2

[Hydrogenation of living polymers with various bis-(cyclopentadienyl)titanium compounds]

The styrene-butadiene-styrene type living copolymer synthesized in Referential Example 7 was diluted with preparatorily refined and dried cyclohexane to produce a cyclohexane solution containing the polymer in a concentration of 10% by weight. A 1,000 g portion of the living polymer solution (polymer content of 100 g) was placed in a dried autoclave having an inner volume of 2 liters and, after the interior of this autoclave was displaced with dry hydrogen gas, the polymer solution was kept at 40° C.

Then, a toluene solution of various titanium compounds indicated in Table IV was added as a catalyst for hydrogenation in an amount to give a hydrogenation catalyst content of 0.50 millimole per 100 g of the

EXAMPLES 35–39

[Variation of amount of catalyst]

The styrene-butadiene-styrene type living block polymer synthesized in Referential Example 5 was diluted with preparatorily dried cyclohexane to produce a cyclohexane solution containing the living block polymer in a concentration of 5% by weight. This polymer solution was hydrogenated by following the procedure of Example 1.

In this case, the amount of bis-(cyclopentadienyl)-titanium dichloride used was varied as indicated in Table V. The results were as shown in Table V.

TABLE V

| Example | 35 | 36 | 37 | 38 | 39 |
|---|---|---|---|---|---|
| Amount of catalyst (millimole/100 g of polymer) | 0.05 | 0.10 | 0.20 | 1.00 | 2.00 |
| Living Li/Ti molar ratio | 33 | 17 | 8.3 | 1.7 | 0.8 |
| Hydrogenation conversion of butadiene units (%) | 64 | 89 | 100 | 90 | 65 |
| Hydrogenation conversion of styrene | <1 | <1 | <1 | <1 | <1 |

TABLE V-continued

| Example | 35 | 36 | 37 | 38 | 39 |
|---|---|---|---|---|---|
| units (%) | | | | | |

EXAMPLES 40-45

[Hydrogenation of living polymer under dissimilar conditions]

The butadiene-styrene-butadiene-styrene type living block polymer synthesized in Referential Example 9 was diluted with dried cyclohexane to produce a cyclohexane solution containing 10% by weight of the polymer. A 1000 g portion of the solution (polymer content of 100 g) was placed in a dry autoclave and subjected to hydrogenation under varying conditions indicated in Table VI by following the procedure of Example 1. The results were as shown in Table VI.

TABLE VI

| Example | 40 | 41 | 42 | 43 | 44 | 45 |
|---|---|---|---|---|---|---|
| Amount of catalyst (millimole/100 g of polymer) | 0.50 | 0.50 | 0.50 | 0.25 | 0.25 | 0.25 |
| Living Li/Ti molar ratio | 3.3 | 3.3 | 3.3 | 6.6 | 6.6 | 6.6 |
| Hydrogen pressure ($kg/cm^2$) | 3.0 | 5.0 | 5.0 | 10.0 | 20.0 | 5.0 |
| Hydrogenation temperature (°C.) | 40 | 20 | 60 | 40 | 40 | 40 |
| Hydrogenation time (min.) | 60 | 60 | 60 | 30 | 30 | 10 |
| Hydrogenation conversion of butadiene units (%) | 98 | 89 | 84 | 99 | 100 | 96 |
| Hydrogenation conversion of styrene units (%) | <1 | <1 | <1 | <1 | <1 | <1 |

EXAMPLE 46

[Continuous hydrogenation]

A styrene-butadiene-styrene type living block polymer was synthesized by faithfully following the procedure of Referential Example 5. When a portion of this living polymer was removed from the autoclave and analyzed, it was found to have a bound styrene content of 30%, a block styrene content of 29%, a 1,2-vinyl bond content of 13% in the butadiene units, and a number-average molecular weight of about 60,000.

In the autoclave, the living polymer fresh from polymerization was placed and kept stirred at 60° C. To the autoclave, 40.0 ml of a toluene solution containing bis-(cyclopentadienyl)titanium dichloride as a hydrogenation catalyst in a concentration of 1.0 millimole/100 ml (living Li/Ti molar ratio ≈4.1) was added and dry hydrogen gas was immediately fed in under a pressure of 5.0 kg/cm² and hydrogenated at 60° C. for two hours under stirring. Substantial absorption of hydrogen gas by the polymer was completed in about 15 minutes. The reaction solution thus obtained was a slightly grayish black homogeneous solution of low viscosity. This reaction solution was treated by following the procedure of Example 1. Consequently, there was obtained a white, rigid thermoplastic elastomeric polymer. The polymer, by analysis, was found to be a hydrogenated polymer having the butadiene units hydrogenated to 99% and the styrene units to less than 1% and having a molecular weight of about 60,000. Although the hydrogenation of the polymer was carried out continuously after the previous stage of polymerization as described herein, the hydrogenating activity and the selectivity in the hydrogenation of butadiene were invariably excellent.

EXAMPLE 47

[Hydrogenation by partial inactivation of living lithium]

The styrene-butadiene-styrene type living block polymer synthesized in Referential Example 5 was diluted with dried cyclohexane to produce a cyclohexane solution containing the polymer in a concentration of 5% by weight. A 1000 g portion of this solution (polymer content of 50 g) was placed in a dry autoclave haing an inner volume of 2 liters, with the interior of the autoclave replaced with dry hydrogen gas.

Into the autoclave, 12.5 ml of a cyclohexane solution containing benzyl chloride in a concentration of 5.0 millimoles/100 ml was added and agitated at room temperature for about 10 minutes. Consequently, there was obtained a living polymer containing 0.40 millimole of living lithium per 100 g of the polymer.

Then, this living polymer was hydrogenated by faithfully following the procedure of Example 36. In this case, the living Li/Ti molar ratio was about 4 during the hydrogenation. The hydrogenated living polymer was treated by the procedure of Example 1, to afford a white polymer. This polymer had its butadiene units hydrogenatd to 98% and its styrene units to less than 1%, indicating that the hydrogenation was feasible despite partial inactivation of living lithium. The hydrogenation conversion of the butadiene units obtained here was higher than in Example 36, indicating that the living Li/Ti molar ratio during the hydrogenation affected the activity.

COMPARATIVE EXAMPLE 3

[Hydrogenation of living inactivated polymer with ($C_5H_5$)$_2$$TiCl_2$]

The styrene-butadiene-styrene type living block polymer obtained in Referential Example 7 was diluted with dry cyclohexane to produce a cyclohexane solution containing the polymer in a concentration of 10%. A 1000 g portion of this living polymer solution (polymer content of 100 g) was placed in a dried autoclave having an inner volume of 2 liters, with the interior of the autoclave replaced with dry hydrogen gas.

Into the autoclave, 50 ml of a cyclohexane solution containing benzyl chloride in a concentration of 5.0 millimoles/100 ml was added and agitated at room temperature for about 10 minutes. The yellowish red living color of the polymer solution was lost at once. The solution assumed a slight transparent, slightly yellow color. This polymer, by analysis, was found to have its living lithium already completely inactivated.

Then, the polymer was hydrogenated by faithfully following the procedure of Example 31 and the resultant hydrogenated polymer was treated by faithfully following the procedure of Example 1. It has its butadiene units hydrogenated to less than 1% and its styrene units to less than 1%, indicating that the polymer no longer retaining living lithium could not be hydrogenated with the titanium compound of this invention.

EXAMPLES 48–51 AND COMPARATIVE EXAMPLE 4

[Hydrogenation with $(C_5H_5)_2TiCl_2$/varying lithium compounds]

The styrene-butadiene-styrene type block polymer synthesized in Referential Example 5 was diluted with cyclohexane to produce a cyclohexane solution containing the polymer in a concentration of 10% by weight. A 1000 g portion of this polymer solution (polymer content of 100 g) was placed in an autoclave having an inner volume of 2 liters and kept at 50° C.

Then, 50 ml of a benzene solution containing bis-(cyclopentadienyl)titanium dichloride as a catalyst (A) in a concentration of 0.25 g (1.0 millimole) and 10 ml of a cyclohexane solution containing various catalysts (B) as indicated in Table VII in a concentration of 5 millimoles were mixed under a hydrogen pressure of 2.0 kg/cm². The resultant combined catalyst solution was wholly added to the autoclave and hydrogen gas was fed in to increase the interior pressure to 5.0 kg/cm² and the contents of the autoclave were agitated for two hours to undergo hydrogenation.

After the hydrogenation, the reaction solution was treated by following the procedure of Example 1, to afford a hydrogenated polymer. It was tested for attributes.

Separately, by way of comparison (Comparative Example 4), the hydrogenation was performed by following the procedure described above, except that triethyl aluminum was used as a catalyst (B). The results were as shown in Table VII.

TABLE VII

| Example | 48 | 49 | 50 | 51 | Comparative Example 4 |
|---|---|---|---|---|---|
| Catalyst (B) | Ethyl lithium | n-Butyl lithium | sec-Butyl lithium | BEL-N11*[1] | Triethyl aluminum |
| Hydrogenation conversion of butadiene units (%) | 91 | 99 | 99 | 95 | 45 |
| Hydrogenation conversion of styrene units (%) | <1 | <1 | <1 | <1 | <1 |

*[1]BEL: Equimolar complex of n-butyl lithium and ethyl lithium (made by Lithium Corporation)

EXAMPLE 52

A hydrogenation was carried out by faithfully repeating the procedure of Example 21, except that the method of addition of the catalyst was changed.

In this case, the addition of the catalyst was carried out as follows. First, 10 ml of a cyclohexane solution containing n-butyl lithium as a catalyst (B) in a concentration of 40 millimoles/100 ml was added to the reaction solution. Subsequently, 100 ml of a toluene solution containing bis-(cyclopentadienyl)titanium dichloride as a catalyst (A) in a concentration of 1.0 millimole/100 ml was added thereto. The reaction solution quickly changed its color from light yellow to thin black. Then, hydrogen was fed in under a pressure of 5.0 kg/cm² to effect hydrogenation of the polymer for two hours. The reaction solution was treated by the procedure of Example 21, to afford a hydrogenated polymer.

The hydrogenated polymer had its butadiene units hydrogenated to 96% and its styrene units to less than 1%. These results were substantially equal to those of Example 21, indicating that the hydrogenating activity and the selectivity were practically invariable despite the fact that the catalyst (A) and the catalyst (B) were separately added to the reaction system instead of being preparatorily mixed and subsequently added in the mixed state.

EXAMPLE 53

The procedure of Example 21 was faithfully repeated, except that a mixture of the catalyst (A) and the catalyst (B) was prepared as the hydrogenation catalyst and stored under a hydrogen pressure of 2.0 kg/cm² at room temperature for five days before it was put to use.

The hydrogenated polymer consequently obtained had its butadiene units hydrogenated to 98% and its styrene units to less than 1%. These results were equal to those of Example 21, indicating that the activity and attributes were not affected when the catalyst was stored.

What is claimed is:

1. A method for the hydrogenation of a conjugated diene polymer in an inert organic solvent, said polymer being obtained by polymerization or copolymerization of a conjugated diene, which comprises effecting selective hydrogenation of unsaturated double bonds in the conjugated diene units of said conjugated diene polymer in the presense of:

(A) at least one bis-(cyclopentadienyl)titanium compound represented by the formula:

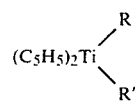

wherein R and R' denote the same or different moieties selected from the group consisting of $C_1$–$C_8$alkyl and alkoxy groups, $C_6$–$C_8$aryl, aryloxy, aralkyl and cycloalkyl groups, halogen groups, and carbonyl groups, and (B) at least one hydrocarbon lithium compound having at least one lithium atom ion as catalysts, with the molar ratio of lithium atoms to titanium atoms being from 0.1 to 100.

2. A method according to claim 1, wherein said conjugated diene polymer is a polymer of 1,3-butadiene and/or isoprene.

3. A method according to claim 2, wherein a 1,2-vinyl bond is contained in a concentration of not less than 30% in the microstructure in said conjugated diene polymer.

4. A method according to claim 1, wherein said conjugated diene polymer is a copolymer of a conjugated diene and a vinyl-substituted aromatic hydrocarbon.

5. A method according to claim 4, wherein said copolymer is a block copolymer having at least one conjugated diene polymer block and at least one vinyl-substituted aromatic hydrocarbon polymer block.

6. A method according to claim 5, wherein the vinyl-substituted aromatic hydrocarbon polymer block content (a) in said block copolymer is 10 to 90% by weight based on the total amount of polymers.

7. A method according to claim 5, wherein the 1,2-vinyl bond content (b) of conjugated diene units in said block copolymer is 30 to 70% by weight based on the total amount of said conjugated diene units.

8. A method according to claim 1, wherein the number-average molecular weight of said conjugated diene polymer is about 1,000 to about 1,000,000.

9. A method according to claim 1, wherein said catalyst consists of at least one of the compounds of (A) and at least one of the compounds of (B).

10. A method according to claim 9, wherein said component (A) of said catalyst is at least one member selected from the group consisting of bis-(cyclopentadienyl)titanium dichloride, bis-(cyclopentadienyl)titanium dimethyl, and bis-(cyclopentadienyl)titanium dicarbonyl.

11. A method according to claim 9, wherein said component (B) of said catalyst is n-butyl lithium.

12. A method according to claim 9, wherein the molar ratio of said component (B) to said component (A) in said catalyst is 0.5 to 20.

13. A method according to claim 9, wherein the amount of said catalyst in terms of the amount of said component (A) is 0.05 to 20 millimoles per 100 g of said polymer.

14. A method according to claim 1, wherein said hydrogenation is carried out at 20° to 80° C. under hydrogen pressure of 2 to 30 kg/cm$^2$.

15. A method according to claim 1, wherein said hydrogenation is effected on at least 50% of the unsaturated double bonds in said conjugated diene units of said polymer.

16. A method according to claim 15, wherein said hydrogenation is effected on at least 90% of the unsaturated double bonds in said conjugated diene units of said polymer.

17. A method according to any of claim 4, wherein said hydrogenation is effected selectively on at least 50% of the unsaturated double bonds in said conjugated diene units of said polymer and on not more than 10% of the vinyl-substituted aromatic hydrocarbon units of said polymer.

18. A method according to claim 17, wherein said hydrogenation is effected selectively on at least 90% of the unsaturated double bonds in said conjugated diene units of said polymer and on not more than 5% of the vinyl-substituted aromatic hydrocarbon units of said polymer.

19. A method according to claim 6, wherein the 1,2-vinyl bond content (b) of conjugated diene units in said block copolymer is 30 to 70% by weight based on the total amount of said conjugated diene units.

20. A method according to claim 5, wherein said hydrogenation is effected selectively on at least 50% of the unsaturated double bonds in said conjugated diene units of said polymer and on not more than 10% of the vinyl-substituted aromatic hydrocarbon units of said polymer.

21. A method according to claim 6, wherein said hydrogenation is effected selectively on at least 50% of the unsaturated double bonds in said conjugated diene units of said polymer and on not more than 10% of the vinyl-substituted aromatic hydrocarbon units of said polymer.

22. A method according to claim 7, wherein said hydrogenation is effected selectively on at least 50% of the unsaturated double bonds in said conjugated diene units of said polymer and on not more than 10% of the vinyl-substituted aromatic hydrocarbon units of said polymer.

23. A method according to claim 8, wherein said hydrogenation is effected selectively on at least 50% of the unsaturated double bonds in said conjugated diene units of said polymer and on not more than 10% of the vinyl-substituted aromatic hydrocarbon units of said polymer.

24. A method according to claim 9, wherein said hydrogenation is effected selectively on at least 50% of the unsaturated double bonds in said conjugated diene units of said polymer and on not more than 10% of the vinyl-substituted aromatic hydrocarbon units of said polymer.

25. A method according to claim 1, wherein said catalyst (B) is a conjugated diene living polymer or a living copolymer containing conjugated diene and vinyl-substituted aromatic hydrocarbon prepared by using an organic lithium compound as a polymerization catalyst and containing a lithium atom in the polymer chain thereof and having a number-average molecular weight in the range of from 1,000 to 1,000,000.

26. A method according to claim 25, wherein said catalyst (A) is bis-(cyclopentadienyl)titanium dichloride.

27. A method according to claim 26, wherein the amount of the catalyst is in the range of 0.005 to 10 millimoles/100 g of the amount of the polymer, computed as the amount of the catalyst (A).

28. A method according to claim 25, wherein the conjugated diene living polymer is a living polymer of 1,3-butadiene and/or isoprene.

29. A methd according to claim 25, wherein the conjugated diene living polymer is a living copolymer of 1,3-butadiene and/or isoprene and styrene.

30. A method according to claim 29, wherein the conjugated diene living copolymer has at least one 1,3-butadiene and/or isoprene block and at least one styrene block in which the styrene block content is in the range of 10 to 90% by weight, and the 1,2-vinyl bond content is in the range of 30 to 70% by weight in the 1,3-butadiene and/or isoprene units.

31. A method according to claim 30, wherein hydrogenation is effected selectively on at least 90% of the unsaturated double bonds in said 1,3-butadiene and/or isoprene units and on not more than 5% of the styrene units.

* * * * *